J. MOREAU.
POTATO DIGGER.
APPLICATION FILED SEPT. 16, 1909.
992,797.
Patented May 23, 1911.
3 SHEETS—SHEET 1.
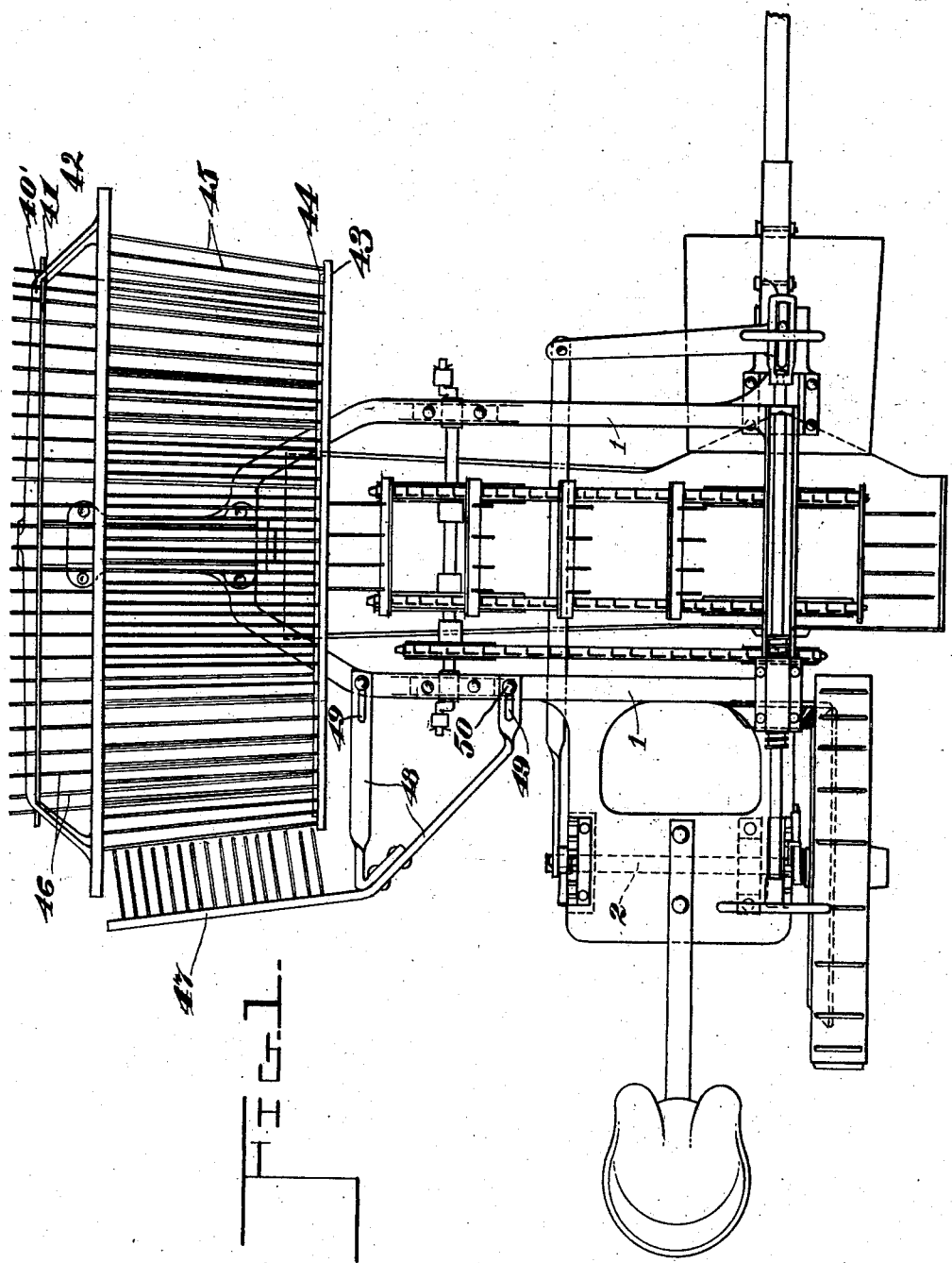
Witnesses.
Joseph Moreau.
Inventor.
Attorneys.

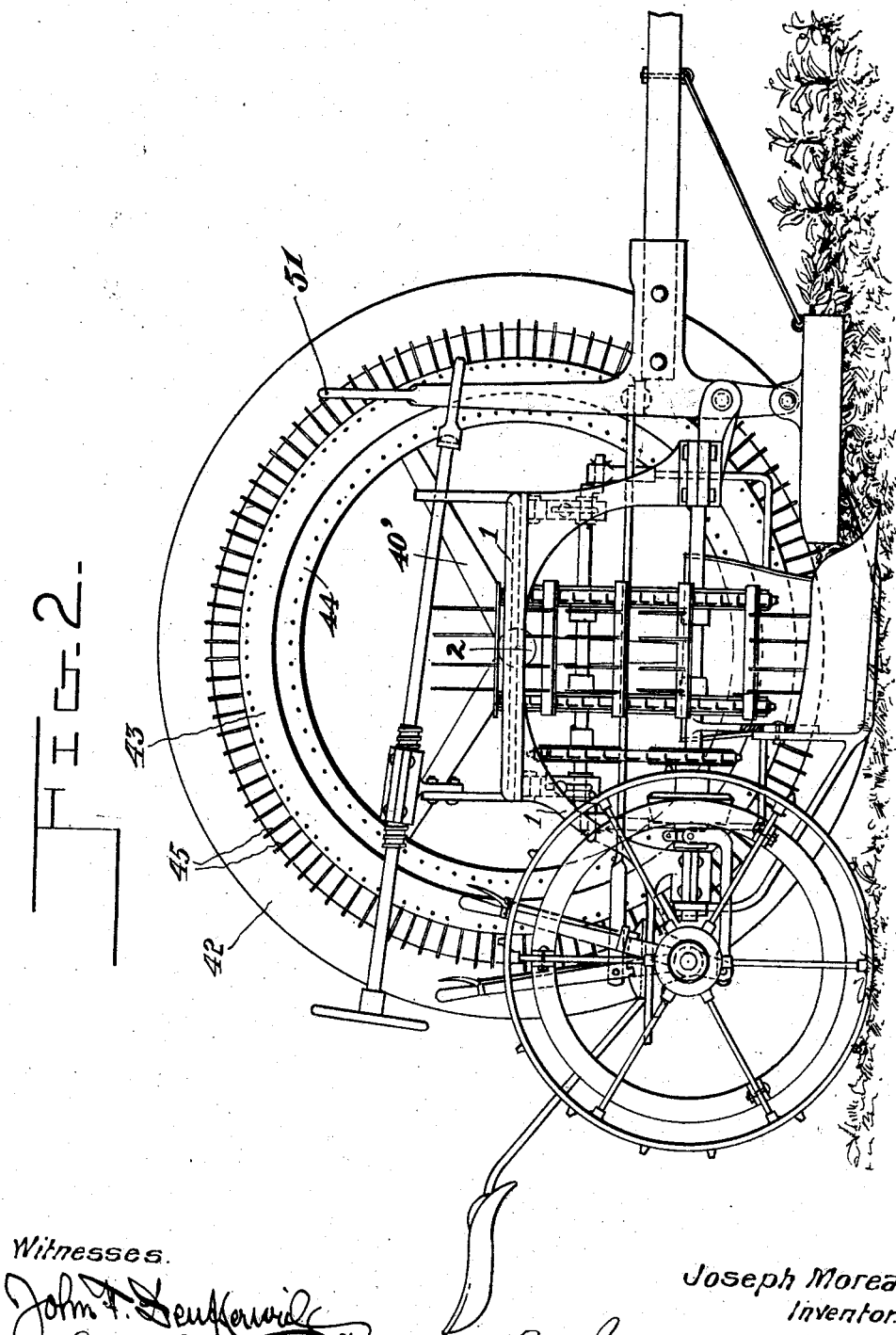

J. MOREAU.
POTATO DIGGER.
APPLICATION FILED SEPT. 16, 1909.
992,797.
Patented May 23, 1911.
3 SHEETS—SHEET 3.
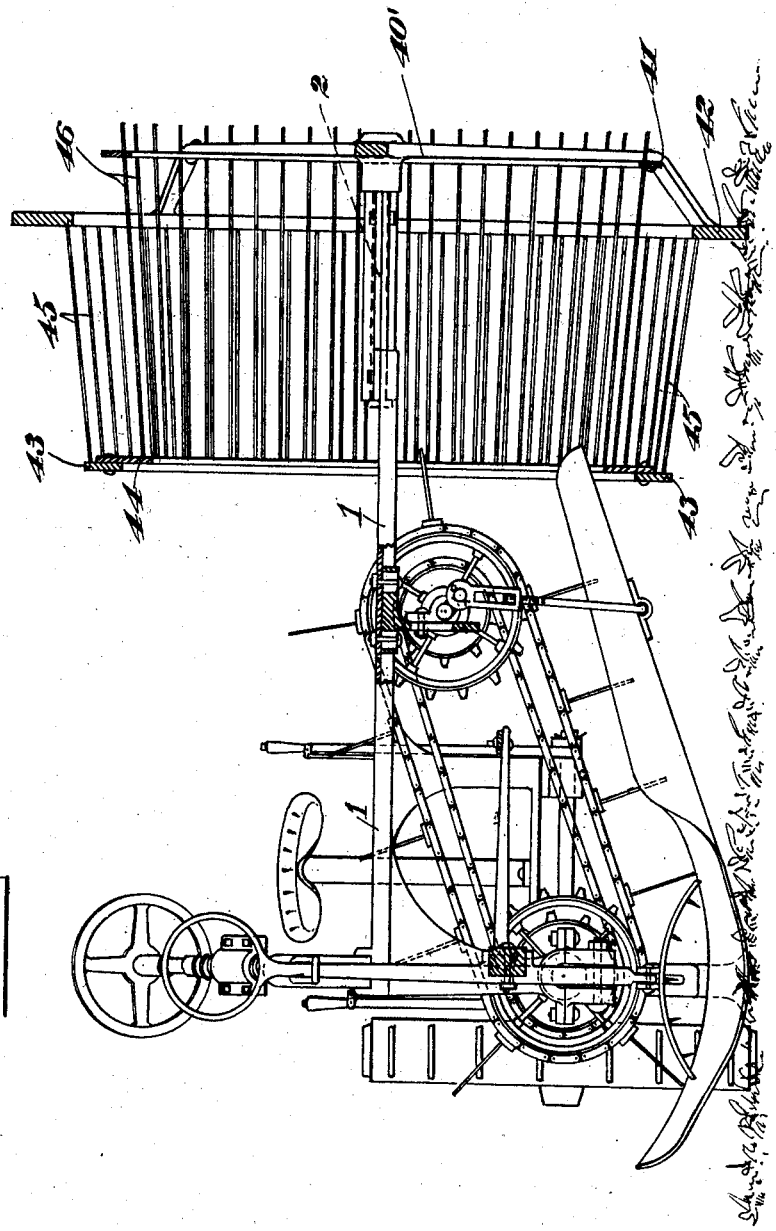
Witnesses.
Joseph Moreau
Inventor
By
Attorneys.

UNITED STATES PATENT OFFICE.

JOSEPH MOREAU, OF ST. GERMAIN DE GRANTHAM, QUEBEC, CANADA.

POTATO-DIGGER.

992,797.  Specification of Letters Patent.  Patented May 23, 1911.

Application filed September 16, 1909. Serial No. 517,989.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Potato-Diggers; and I do hereby declare that the following is a full, clear, and exact description of the invention, such as will enable others skilled in the art to which it appertains to make and use the same.

The invention to be hereinafter described relates to vegetable harvesting machines, and more particularly to machines of the type more generally known as potato diggers.

In order to more clearly disclose the construction, operation and use of the invention, reference should be had to the accompanying drawings forming part of the present application.

Throughout the several figures of the drawings, like reference characters designate the same parts.

In the drawings: Figure 1 is a plan view of the machine complete; Fig. 2 is a side elevation of the same; and, Fig. 3 is a front view, partly in section.

When the potatoes have been dug it is necessary, of course, to thoroughly separate them from the grass, weeds, vines, &c., which accompany them, and to sift out the earth. A specially constructed combination separator and sifting wheel has been provided for this purpose. This wheel comprises two concentrically disposed cage-like members, each of substantially frusto-conical shape, the innermost member being supported by the outer member and mounted to form an annular space or chamber therebetween. In the preferred form, a spider 40′, having an axle bearing for one of the axles 2, is provided. On this spider are concentrically arranged two wheel rims 41 and 42, of different diameters, the rim 42 being of greater diameter, and placed nearer the center of the machine. Inner rims 43 and 44 are also provided, both of less diameter than the rim 42, and the rim 44 being also of less diameter than the rim 43. The rims 42 and 43 are connected by a plurality of substantially parallel inclined rods 45, so placed as to allow free passage of loose earth, but to prevent passage of potatoes of any considerable size. The rims 41 and 44 are connected by a plurality of rods 46 similar to rods 45 and similarly arranged, except that the rods 46 are arranged with considerably greater intervals between them. In this way, the earth, grass, weeds, potato vines and potatoes will all fall upon the rods 46 of the inner member first. These rods, being widely spaced, will allow free passage of practically everything except weeds, grass, vines, and similar debris. This debris will pass gradually down the rods 46 to the outer ends thereof, and be delivered in a long, narrow row. The potatoes and earth which have passed between the rods 46 will fall onto the rods 45, and the earth and like material will pass between the same, leaving only the separated and sifted potatoes to pass from the rods 45 and be delivered in long rows parallel to and a short distance from the long rows of grass, vines, &c. In order to keep the space between the rods 45 at all times open and unclogged, a brush 47 has been provided. This brush is fastened to struts 48, provided with slots 49 adapted to receive the shanks of tightening bolts 50, by which the struts may be adjustably connected to the frame 1, so that its bristles may be moved toward or from the rods 45, as may be desired.

It is thought that the operation and use of the invention will be clear from the preceding detailed description.

Having thus fully described my invention, what I claim as new, and desire to secure by Letters Patent, is:—

A combined separating and sifting device for potato diggers, comprising a spider, two concentrically arranged rims carried by the said spider, two other rims concentrically arranged and each of less diameter than one of the rims carried by the spider, and a plurality of rods connecting said rims in pairs, the rods connecting the rims of lesser diameter being of considerably greater length than, and extending outwardly beyond the ends of the rods connecting the rims of greater diameter.

In witness whereof I have hereunto set my hand in the presence of two witnesses.

JOSEPH MOREAU.

Witnesses:
W. S. BABCOCK,
T. MYNARD.